United States Patent [19]

Ver Nooy

[11] Patent Number: 4,522,063
[45] Date of Patent: Jun. 11, 1985

[54] METHODS AND APPARATUS FOR INDICATING SELECTED PHYSICAL PARAMETERS IN A PIPELINE

[75] Inventor: Burton Ver Nooy, Tulsa, Okla.

[73] Assignee: T. D. Williamson, Inc., Tulsa, Okla.

[21] Appl. No.: 532,753

[22] Filed: Sep. 16, 1983

[51] Int. Cl.³ .............................................. G01N 29/04
[52] U.S. Cl. .................... 73/579; 73/40.5 A; 73/586; 73/592
[58] Field of Search ............ 73/40.5 A, 592, 586, 73/587, 579, 582

[56] References Cited

U.S. PATENT DOCUMENTS

| | | | |
|---|---|---|---|
| 2,617,134 | 11/1952 | Barton, Jr. | 73/40.5 A |
| 3,097,523 | 7/1963 | Diamond et al. | 73/586 |
| 3,508,433 | 4/1970 | Bustin | 73/40.5 A |
| 3,580,056 | 5/1971 | Warner | 73/579 |
| 4,400,980 | 8/1983 | Lepert | 73/579 |
| 4,446,734 | 5/1984 | Empson | 73/586 |

Primary Examiner—Howard A. Birmiel
Attorney, Agent, or Firm—Head, Johnson & Stevenson

[57] ABSTRACT

A method of detecting inadequately supported sections or overloaded points in a pipeline including the steps of traversing the interior of the pipeline with an instrumentation pig, sequentially striking or vibrating the wall of the pipeline by means carried by the pig to introduce vibratory signals into the pipeline, receiving said signals from within the pipeline by listening to the sounds generated as a consequence of the striking of the interior wall, and detecting preselected characteristics of received sound which are indicative of unsupported sections or of points of load and stress concentration in the pipeline.

22 Claims, 3 Drawing Figures

METHODS AND APPARATUS FOR INDICATING SELECTED PHYSICAL PARAMETERS IN A PIPELINE

SUMMARY OF THE INVENTION

Pipelines buried in the earth are engineered to be uniformly supported by the earth. When a pipeline is buried in a ditch formed in the earth the ditch is backfilled with material which will settle around the pipeline and provide support for it. As long as the physical support of a pipeline is uniform the possibility of the development of overstressed areas is reduced. On the other hand, if the support for a pipeline changes so that sections are not properly supported, areas of high stress can develop which ultimately can cause deformations, cracks or breaks in the pipeline.

The problem of providing uniform support for a buried pipeline is particularly of concern in areas where the pipeline passes under streams, rivers and so forth, or in areas of poor soil stability or of shifting terrestrial forces due to earthquakes, settling, frost heave and water intrusion. When a pipeline crosses a stream the line may be initially supported in a proper manner when installed but if changes in flow patterns occur so that the stream washes away a substantial portion of the pipeline support, then areas may develop wherein a portion of line remains unsupported and the weight of the pipeline and its contents may be concentrated at points which exceed the structural limits of the pipe material.

The present invention is directed toward a method and apparatus for detecting areas of inadequate or overly concentrated support in a pipeline buried in the earth or submersed below a body of water, that is, in areas where it is not subject to a visual inspection. The method of the invention includes traversing the interior of a pipeline with an instrumentation pig. The pig includes a means of introducing a sequence of sound signals into the pipeline. A preferred method of introducing sound signals is to physically strike the interior of the pipeline in a repetitive periodic manner. When struck on its interior surface, vibrations or sound signals are set up in the pipeline. These sound signals are received by equipment carried in the instrument pig, are amplified and recorded. The record can then be analyzed to indicate the areas of inadequate support or overload of the pipeline.

It has been observed that sound signals introduced into a pipeline substantially contacted, restrained and supported above, below and on all sides with earth are quickly damped. However, where the pipeline is unsupported, that is, not in firm contact by the earth, the damping of the vibration introduced into the pipeline is diminished so that the detectable vibration persists for a longer time. Contrariwise, where the load is concentrated, as when the weight of a significant length of pipeline is borne by resting on a projecting rock, the damping effect is increased at that point. It can be readily identified by its rapid sound level deterioration compared to the normally supported decay rate and particularly when compared to an adjacent unsupported section's elongated decay rate. In addition to the aforementioned change in decay rate, the pitch or frequency of vibration will be changed by the changes in tensile stress on the pipe much as the pitch of the noise produced by a violin string is changed by changing the tension on that string. Thus an additional identifying means is introduced through the analysis of change in pitch or frequency as well as in change in duration of sound above some specific level of amplitude or volume. This invention makes use of one or more of these phenomena as means of indicating the lack of support or overloading of the pipeline.

In practicing the method of the invention an apparatus is employed in the form of an instrument pig including means to cause the pig to travel through the pipeline, such as by cups which obstruct the flow of fluid past said pig causing it to be propelled through the line. Extending from the pig is a means to strike the interior of the pipeline such as a wheel resiliently biased to engage the pipeline, the wheel having a step in it so that on each revolution a portion of the perimeter of the wheel engages the pipeline with a striking action to introduce sound signals into it. The sound is received by a microphone, the received sound being amplified or analyzed and recorded. The noise characteristics made may be analyzed within the pig after the pig is removed from the pipeline to indicate areas wherein the sound characteristics produced as a consequence of striking the pipeline indicate lack of support or an excessive concentration of loading. By correlating these indications with a distance measuring, location sensing or timing mechanism carried by the pig the location of unsupport or stress concentration in the pipeline can be identified so as to enable operators of the pipeline to investigate and take corrective action as necessary.

DETAILED DESCRIPTION OF THE PREFERRED EMBODIMENT

Figure 1:
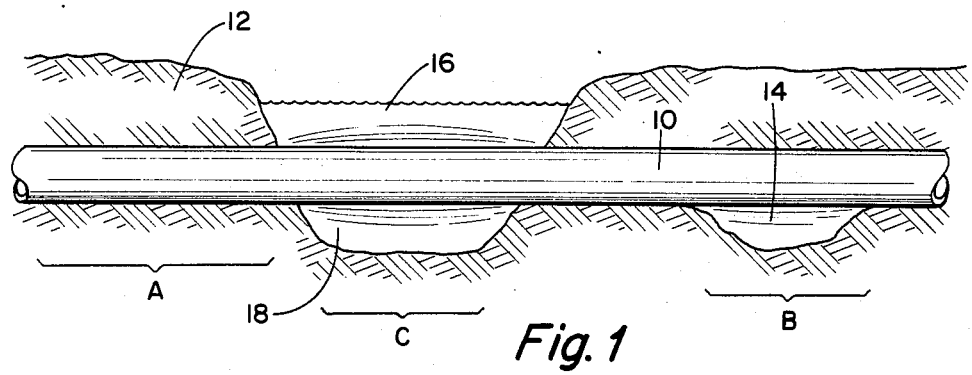
FIG. 1 is a cross-sectional elevational view of a pipeline traversing the earth showing typical areas where unsupport may occur.

Referring to the drawings and first to FIG. 1, the environment in which the method and apparatus of the invention may be employed is illustrated. A pipeline 10 is shown buried in the earth 12. In the area indicated by the letter A the pipeline is well supported by substantial contact with the earth on all sides and therefore is less likely to develop points of stress where breakage may occur. The area indicated by the letter B shows a wash out, thawing or settlement 14 underneath the pipeline. The area C shows the pipeline passing under a stream 16 in which the moving stream has washed out stream bed material at 18 so that the pipeline is no longer supported by the stream bottom.

The illustrations of FIG. 1 are merely exemplary. The lack of support of a pipeline may also be incurred by shifting in the earth that takes place in fault areas or by improper construction practices. In any event and for whatever the reasons, the operators of pipelines desire to know if there are areas in their pipelines which have introduced locations where the pipeline is not properly supported and therefore where potential problems may arise. The object of this invention is to provide methods and apparatus to help operators identify areas of insufficient pipeline support or points of stress concentration which may result from soil or pipe movement or from loss of the aforementioned support.

Figure 2:
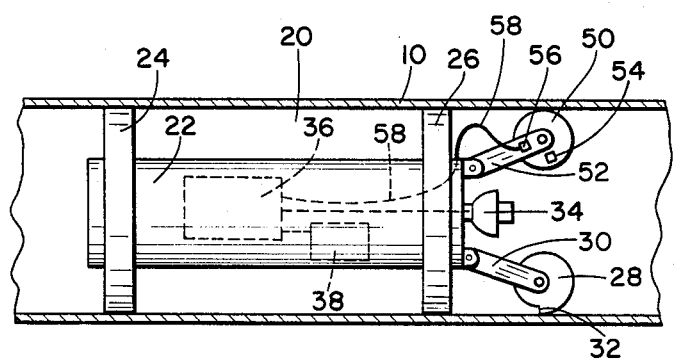
FIG. 2 is a cross-sectional view of a pipeline having an instrument pig of this invention therein for use in practicing the method of the invention.

To accomplish the above defined objectives an instrument pig generally indicated by the numeral 20 and as shown in FIG. 2 is employed. The pig includes a body 22 having cups 24 and 26 which may serve the dual function of supporting the body within pipeline 10 and moving the pig through the pipeline. This is achieved since the cups 24 and 26 impede the flow of fluid past the pig to cause the pig to move with fluid flow through the pipeline. Cups, discs or other sealing means 24 and 26 may be of a variety of configurations as is well well known in the art of manufacturing pipeline pigs.

Extending from the body 22 is a means of introducing a sound signal on a periodic basis into pipeline 10. In the preferred arrangement of this invention the sound signal is achieved by physically striking the interior of the pipeline. This can be done by means of a hammer carried by the pig activated to strike the pipeline (not illustrated), by a solenoid actuated striking bar carried by the pig body 22 (not illustrated), by pressure or pipeline fluid actuated striking means (not illustrated), or by means of a stepped wheel 28 or other mechanical means resulting from the pigs motion relative to the pipeline. The wheel 28 is mounted on an arm 30 which is urged outward from the pig body 22, that is towards the interior of a pipeline wall 10. The periphery of wheel 28 has a step 32 formed in it. As the wheel 28 rolls past the step 32 the lesser radius of the wheel suddenly drops to forceably contact the interior of the pipeline wall introducing vibrations into the pipeline. These vibrations generate sound within the pipeline which is received by a microphone 34 and fed to electronic instrumentation 36 where the sound is amplified, electronically modified or analyzed as desired, and the output or generating means recorded. A battery 38 carried within the pig body 22 provides electrical energy for operation of instrumentation 36.

Figure 3:
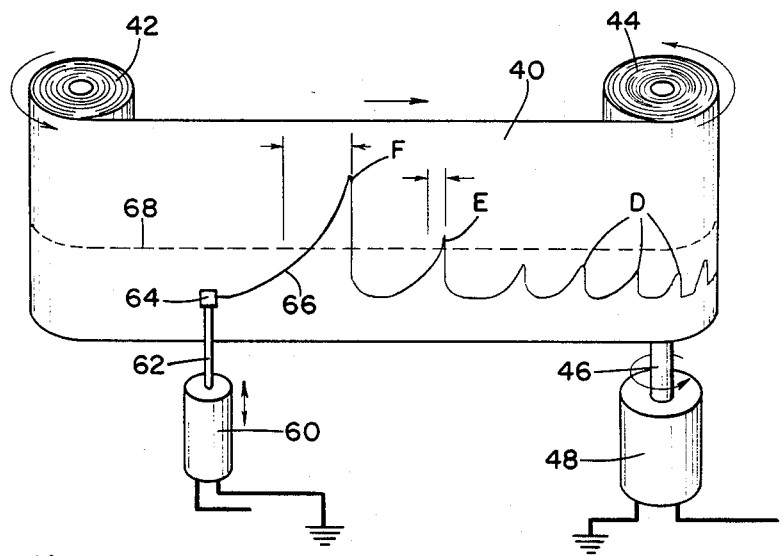
FIG. 3 is a chart of the type which can be employed to record the effect of sound signals introduced into and received from the wall of a pipeline and illustrating ways in which the characteristics of the received signals may be employed to indicate areas of inadequate support or overloading of the pipeline.

A variety of different types of sound recording systems may be employed as a part of instrumentation 36. For instance, the sound received by microphone 34 may be simply recorded such as on a magnetic tape. After the pig has been run through a pipeline the tape is removed and the recorded sound can then be examined in a laboratory and treated in a variety of ways to look for specific characteristics. A simple means of employing the invention is illustrated in FIG. 3 in which the instrumentation 36 includes a chart 40 which moves from a supply role 42 to take up roll 44. The chart moves in response to the rotation of a shaft 46 extending from a motor mechanism 48 which, while illustrated as being of a typical motor type, may be a rachet-driven device. The motor 48 can function in one of two basic ways; that is, it can rotate at a constant speed, or, more preferably, can advance in proportion to the movement of the pig through the pipeline. When this latter method of operation is employed, a device must be provided for detecting movement of the pig through the pipeline. Returning again to FIG. 2, an odometer wheel 50 is shown extending by means of arm 52 from the pig body, the arm being biased outwardly so that the odometer wheel 50 firmly engages the interior wall of the pipeline. Secured to the wheel 50 is a small magnet 54 which, on each revolution of the wheel, actuates a magnetic switch 56. This provides a signal on conductor 58 which fed to instrumentation package 36. The signal supplied by conductor 58 may either be employed to control the rate of movement of motor mechanism 48 or it may be utilized to provide a separate marking on chart 40 (not shown) so that by either method, the position of the pipeline pig in the pipeline when a certain event indicated on the chart occurs can be determined.

Alternatively, the pig instrumentation may count the noise, motion or rotation pulses received fronm stepped wheel 28 to monitor pig travel and/or mark or advance the chart or record proportionally thereto.

Referring again to FIG. 3, a stylus driver 60 moves a stylus arm 62 having a stylus 64 at the outer end which provides a mark 66 on chart 40.

The mark 66 is illustrative of a means of practicing the invention. With each introduction of sound into the pipeline such as by striking it as wheel 28 rotates, a sound signal is received as indicated by the letter D. When the pipeline is struck sound immediately initiates at some level as the pipeline vibrates. If the pipeline is well supported, the vibrations quickly die out thus producing a wave form as illustrated by the letter D having a sharp forward face and a rapidly declining rearward face.

When an area of unsupport (such as indicated by the letter B of FIG. 1 occurs) the sound introduced as a consequence of the vibrations within the pipeline as wheel 28 strikes it may be of greater apparent intensity and of longer duration. Stated another way, since the pipeline is unsupported by the settled area 14 it will tend to vibrate more readily and longer. A detected sound of greater apparent intensity and of longer duration is indicated on the chart by the letter E.

When the pipeline enters an area such as indicated by the letter C in FIG. 1 wherein it is unsupported for a relatively long span, in particular where no support contacts the pipeline, an even greater level of apparent sound intensity and duration will occur in the pipeline as indicated on the chart by the letter F.

It can be seen that a great variety of means may be employed to analyze the sound signal received by microphone 34. For instance, when the sound is treated in the way indicated by FIG. 3 wherein a chart 40 is employed to reflect the amplitude of the sound, the occurrence of a detected sound having an amplitude above a selected level such as indicated by the dotted line 68 may be used to indicate areas of potentially problem causing lack of support. The instrumentation may be arranged so that only areas wherein the sound is of sufficient amplitude or duration, such as that occurring above the dotted line 68, is significantly sensed or acted on with no record, memory, indication or action made of the typical sound signals which are generated and received in adequately supported areas. Only those points exceeding some chosen preset parameters would then be recorded or used as received to initiate a record of their location, a record of their intensities, frequencies or other significant characteristics or a secondary signal more easily converted to location and/or structural appraisal. The entire record then could indicate by a short series of pipeline footage numbers the relatively few places to be investigated on site.

The chart of FIG. 3 is of the type which reflects primarily levels of sound volume and duration. Other ways may be employed for analyzing the sound such as studying the frequency of vibration, or the frequency versus duration, or a combination of the three; that is, intensity, duration and frequency. It can be seen that after a history of experience has been developed that the method of recording and analyzing the received sound within the pipeline can be improved to a great degree of sophistication; however, such would all be within keeping of the basic principles and concepts as set forth herein. Generally, the duration of a sound signal following a strike such as indicated by the letters E and F, can be employed as indications of potential problem areas due to inadequate pipeline support.

While the invention has been described with a great degree of particularity it is manifest that many changes may be made in the details of construction and arrangement of the invention and in the steps and sequence thereof for practicing the method of the invention. While the invention is not to be limited to the specific embodiments set forth herein for purposes of exemplification it is understood that the invention is to be limited only by the scope of the attached claim or claims, including the full range of equivalency of each step or element thereof.

What is claimed is:

1. A method of detecting selected physical parameters in a pipeline comprising the steps of:
    traversing the interior of the pipeline by an instrumentation apparatus;
    introducing a sequence of sound signals into the pipeline while traversing the said pipeline;
    receiving sound signals from within the pipeline occurring as a consequence of the vibration of the pipeline in response to said introduced sound signals; and
    determining physical parameters of the pipeline by analysis of characteristics of the received signals.

2. The method of claim 1 in which the step of introducing a sequence of sounds into the pipeline includes the step of sequentially physically striking the interior of the pipeline.

3. The method of claim 1 in which the step of receiving sound signals includes recording preselected characteristics of the received sound signals above a preselected intensity level.

4. The method of claim 1 in which the step of determining preselected characteristics of the received sound includes determining the time duration of sound resonance above a preselected volume level.

5. The method of claim 1 in which the step of determining preselected characteristics of the received sound includes determining the level of sound generated by the introduction of sound vibration or shock-induced signals into the pipeline.

6. The method of claim 5 in which the step of determining the level of sound reacted by the introduction of sound signals into the pipeline includes determining the level of sound introduced by internal impact on the interior of the pipeline.

7. The method of claim 4 for use in ascertaining the location of areas of unsupport of a pipeline in which the duration of sound resonance above a preselected volume level is compared with the average duration of sound resonance above such preselected level for a substantial length of the pipeline.

8. The method of claim 1 including the step of:
    measuring the traverse of the instrumentation apparatus through a pipeline; and
    correlating the determined preselected characteristics of received sound signals with the measured traverse to provide indication of the locations of the pipeline physical parameter producing such received sound signals.

9. A method of claim 1 in which the signals selected for consideration fall within a predetermined range of responses predicted to represent pipeline conditions of specific interest.

10. A method of detecting unsupported sections in a pipeline comprising:
    traversing the interior of the pipeline with an instrumentation apparatus;
    introducing a sequence of signals into the pipeline while traversing the said pipeline by striking the interior wall of the pipeline employing means carried by the instrumentation apparatus;
    receiving sound signals from within the pipeline occurring as a consequence of the striking of the interior wall, the means of receiving the sound signals being carried by the instrumentation; and
    detecting preselected characteristics of the received sound which characteristics are indicative of unsupported sections of the pipeline.

11. The method of claim 10 wherein said step of detecting preselected characteristics of the received sound which are indicative of lack of pipeline support includes detecting the degree of resonance represented by the detected sound.

12. The method of claim 10 wherein said step of detecting preselected characteristics of the received sound which are indicative of lack of pipeline support includes detecting the degree of persistance of resonance represented by the detected sound.

13. The method of claim 11 wherein the step of detecting the degree of resonance represented by the detected sound includes detecting the time duration of sound above a preselected level following said step of initiating a sound wave in the pipeline wall.

14. The method of claim 10 including the step of:
    measuring the traverse of the instrumentation package through the pipeline; and
    correlating the detected preselected characteristics of the received sound with the results of measuring the traverse as a means of indicating the locations of detected unsupported sections.

15. The method of claim 10 wherein said step of detecting preselected characteristics of the received sound which are indicative of lack of pipeline support includes detecting the amplitude of the detected sound.

16. The method of claim 10 wherein said step of detecting preselected characteristics of the received sound which are indicative of lack of pipeline support in high stress includes detecting the frequency of the detected sound.

17. The method of claim 10 wherein said step of detecting preselected characteristics of the received sound which are indicative of lack of pipeline support includes detecting the amplitude and duration of the detected sound.

18. The method of claim 10 including:
    recording the received sound signals on a record medium.

19. Apparatus for indicating the existance of selected physical parameters in a pipeline, comprising:
    a pipeline pig dimensioned to traverse the interior of a pipeline;
    means to propel said pig through a pipeline;
    means carried by said pig to introduce into a pipeline a sequence of sound signals during traverse of the pipeline; and means of receiving sound signals from within the pipeline occurring as a consequence of the introduced sound signals, which received sound signals may be employed to provide an indication of the pipeline physical parameters.

20. Apparatus according to claim 19 wherein said means to propel said pig through a pipeline includes means forming a piston relationship with the pipelines moves said pig by the force of such fluid flow.

21. Apparatus according to claim 19 wherein said means to introduce a sequence of sound signals includes means to sequentially strike the interior of the pipeline.

22. Apparatus according to claim 21 wherein said means to strike the interior of a pipeline includes a wheel supported to said pig and resiliently biased to engage and roll on the interior of the pipeline, the wheel having a circumferential pipe engaging surface each revolution a portion of the periphery of the wheel strikes the pipe.

* * * * *